United States Patent [19]

Woinsky

[11] 4,089,175

[45] May 16, 1978

[54] PROCESS AND SYSTEM FOR RECOVERY OF ENERGY FROM GEOTHERMAL BRINES AND OTHER WATER CONTAINING SOURCES BY DIRECT CONTACT WITH A WORKING FLUID BELOW THE CRITICAL PRESSURE

[75] Inventor: Samuel G. Woinsky, Irvine, Calif.

[73] Assignee: Occidental Petroleum Corporation, Los Angeles, Calif.

[21] Appl. No.: 611,310

[22] Filed: Jun. 23, 1975

[51] Int. Cl.$^2$ .............................................. F03G 7/00
[52] U.S. Cl. .................................. 60/641; 122/31 R; 165/45
[58] Field of Search ................ 165/45; 60/641; 122/31

[56] References Cited

U.S. PATENT DOCUMENTS

| | | | |
|---|---|---|---|
| 2,222,575 | 11/1940 | Schutte | 122/31 R |
| 2,561,471 | 7/1951 | Hatfield | 122/31 R |
| 3,845,627 | 11/1974 | Hutchinson | 165/45 X |
| 3,957,108 | 5/1976 | Van Huisen | 60/641 X |
| 3,988,895 | 11/1976 | Sheinbaum | 60/641 |

*Primary Examiner*—Allen M. Ostrager

*Attorney, Agent, or Firm*—Max Geldin; Barry A. Bisson; William G. Lane

[57] ABSTRACT

Process and system for recovery of energy from geothermal brines and other water containing or hot water sources, which comprises direct contact heat exchange between the brine or hot water, and a working fluid, e.g. n-butane, in a heat transfer column, the heat transfer column being operated in the subcritical pressure region of the working fluid, close to or approaching the apex of the saturated vapor curve for such working fluid on the Mollier enthalpy-entropy diagram for such fluid. The heated working fluid exiting the top of the heat transfer column is expanded through an expander to produce work. The discharge from the expander is cooled to condense working fluid which is separated in an accumulator, from condensed water vapor present in the working fluid, and the condensed working fluid is pressurized and fed back to the heat transfer column.

Cooled brine or water from the bottom of the heat transfer column and water from the accumulator are fed to a flashing device such as a flash drum operated at a pressure less than that in the accumulator, and the working fluid flashed off is compressed and returned to the cooler at the expander discharge, for condensation and recovery. Uncondensible gases plus working fluid losses are vented from the accumulator. Cold brine or water is discharged from the flashing means such as the flash drum, and any scale formed in the heat transfer column is discharged from the bottom thereof.

49 Claims, 6 Drawing Figures

Fig. 5

PROCESS AND SYSTEM FOR RECOVERY OF ENERGY FROM GEOTHERMAL BRINES AND OTHER WATER CONTAINING SOURCES BY DIRECT CONTACT WITH A WORKING FLUID BELOW THE CRITICAL PRESSURE

BACKGROUND OF THE INVENTION

This invention relates to the recovery of energy from geothermal brines and other hot water sources, and is particularly concerned with a process and system of the aforementioned type, employing direct contact heat exchange between the hot brine or other water containing fluid such as hot water feed, and a working fluid under certain pressure conditions, wherein the heated working fluid is expanded to produce work, and the expanded and discharged working fluid is recycled to the heat transfer column, and further providing for working fluid recovery under conditions to afford an economic balance between energy recovery and working fluid loss.

The prior art has failed to recognize the problem of working fluid loss in uncondensible gases which come into the system particularly with the hot brine or hot water and which must be vented. Further, the prior art has failed to provide for the problem of working fluid loss in exit brine or hot water from the heat transfer column, and recycle of such recovered working fluid to the heat transfer column.

In my copending application titled PROCESS AND SYSTEM FOR RECOVERY OF ENERGY FROM GEOTHERMAL BRINES AND OTHER HOT WATER SOURCES, Ser. No. 589,068, filed June 23, 1975, there is described a process and system comprising heating the brine or hot water source in a direct contact heat transfer column, and having as an important feature the operation of the heat transfer column at or above the critical pressure of the working fluid, with the hot brine or hot water feed at or above the critical temperature of the working fluid, and converting the working fluid to a dense phase fluid. The heated working fluid is then passed through an expander to produce work, and the working fluid discharged from the expander is cooled and condensed, and such working fluid is separated and pumped back to the heat transfer column to be heated and carried through the cycle repeatedly.

It is an object of the present invention to provide a process and system for recovery of energy from geothermal brines and hot water sources by operation of a heat transfer column providing direct heat transfer between the hot brine or hot water, and a working fluid, under conditions of operation particularly with respect to pressure in the heat transfer column in relation to the critical pressure of the working fluid, different from the critical or supercritical conditions of my above application, yet affording maximum energy recovery for any individual working fluid. A further object is to provide a process and system of the aforementioned type which operates under subcritical pressure conditions with respect to the working fluid in the heat transfer column, in contrast to the critical or supercritical pressure conditions of operation of my above copending application. A further object is the provision in the procedure and system, for removal of working fluid from the exit brine or water from the column and recovery of such working fluid. A still further object is the control of the working fluid concentration in the uncondensible vent gas from the system to obtain an economic balance between energy recovery from the process and system, and working fluid loss in the uncondensible vent gas.

BRIEF SUMMARY OF THE INVENTION

The above objects are achieved according to the invention by the provision of a process and system for recovering energy from geothermal brines and other water containing or hot water sources such as ground waters heated by solar energy or other means, the energy being recovered from the brine or hot water using a working fluid such as a hydrocarbon, e.g. n-butane. The working fluid is heated by the brine or hot water preferably in a direct contact heat transfer column. The heated working fluid is passed through an expander to produce work, which is used to generate electricity or drive equipment. The working fluid from the expander is condensed in a cooler. Condensed working fluid, water and uncondensed gas are separated in an accumulator. The cool liquid working fluid is pumped from the accumulator to the heat transfer column to be heated and carried through the cycle repeatedly.

Cooled brine or water which heated the working fluid in the heat transfer column exits from the bottom of the column which acts as a liquid-liquid separator to minimize entrainment of the working fluid. This cooled brine or water withdrawn from the column is mixed with water separated from the working fluid in the accumulator, and is flashed at a pressure lower than that in the accumulator to flash off entrained and dissolved working fluid in the brine or water from the heat transfer column. The flashed working fluid is then compressed and fed to the cooler at the discharge from the expander, which is used to condense working fluid, and thus is recovered.

Uncondensible gases which are introduced into the system with the feed brine or hot water are vented from the system at the accumulator, and carry away some of the expanded working fluid. If desired, stripping of the cooled brine or water withdrawn from the column, with uncondensed gas from the accumulator for recovery of working fluid from such brine or cool water can be employed, if necessary, to further decrease the loss of working fluid in such exit brine or water.

Uncondensed gas is vented from the accumulator preferably under pressure control set for an economic balance between working fluid loss in the vent gas and energy recovery in the expander. If necessary, in order to decrease the loss of working fluid in the vent gas, the hot water or brine feed to the heat transfer column is initially degassed. This operation will decrease the amount of uncondensible vent gas from the accumulator, and the loss of working fluid therewith.

An important feature of the present invention process and system resides in operating the heat transfer column so that the top of the column is in the subcritical pressure region of the working fluid close to or approaching the apex of the saturated vapor curve on the Mollier diagram for such fluid. This procedure provides a working fluid boiling zone at the top of the column. In view of the lower pressure of the resulting vaporized working fluid as compared to operation under critical or supercritical pressure conditions, somewhat less energy is recovered per lb. of working fluid but more lbs. of working fluid are circulated resulting in similar energy recovery per stage but a lower cold brine temperature. Advantages which can accrue from operation under subcritical pressure conditions include simplicity of controls.

In normal operation, since the cooled brine or water exiting the column and which is flashed off to recover entrained or dissolved working fluid, can still be at a relatively high temperature, in order to maximize the recovery of energy from the hot brine or hot water feed, two or more units of the basic system noted above can be employed in series, the flashed exit brine or water from one unit of the system serving as the feed to the heat transfer column of the second like unit, etc. In such modification a different working fluid can be employed in the heat transfer column of the second unit from the working fluid in the heat transfer column of the first unit, in order to adjust the conditions of the hot working fluid in the second heat transfer column to a point near the apex of the saturation curve on a Mollier diagram and thus maximize energy recovery.

Another invention feature is the use of mixtures of working fluids, e.g. in the heat transfer column of the above noted second unit, in order to adjust the position of the working fluid saturation curve apex, and to thus obtain optimum operation.

A further feature of the invention is the flashing or stripping of working fluid contained in the exit brine or water from the heat transfer column, followed by compression and condensation of such working fluid to provide recovery of working fluid from such exit brine or water.

A still further feature of the invention is the degassing of the feed brine or hot water prior to introduction into the heat transfer column, and accumulator pressure control for economic balance between energy recovery and working fluid loss in the vent gas from the accumulator, affording minimum working fluid loss.

The invention process and system including particularly a combination of certain of the above features affords an economical and highly practical process and system for energy recovery from geothermal brines and other hot water sources.

THE DRAWINGS

The above and other features and advantages of the invention will be more clearly understood by reference to the following detailed description of the invention, taken in connection with the accompanying drawings wherein:

FIG. 5 illustrates a Mollier diagram for a typical working fluid, such as n-butane, showing operation under subcritical condition according to the invention.

DETAILED DESCRIPTION

Figures 1, 2:
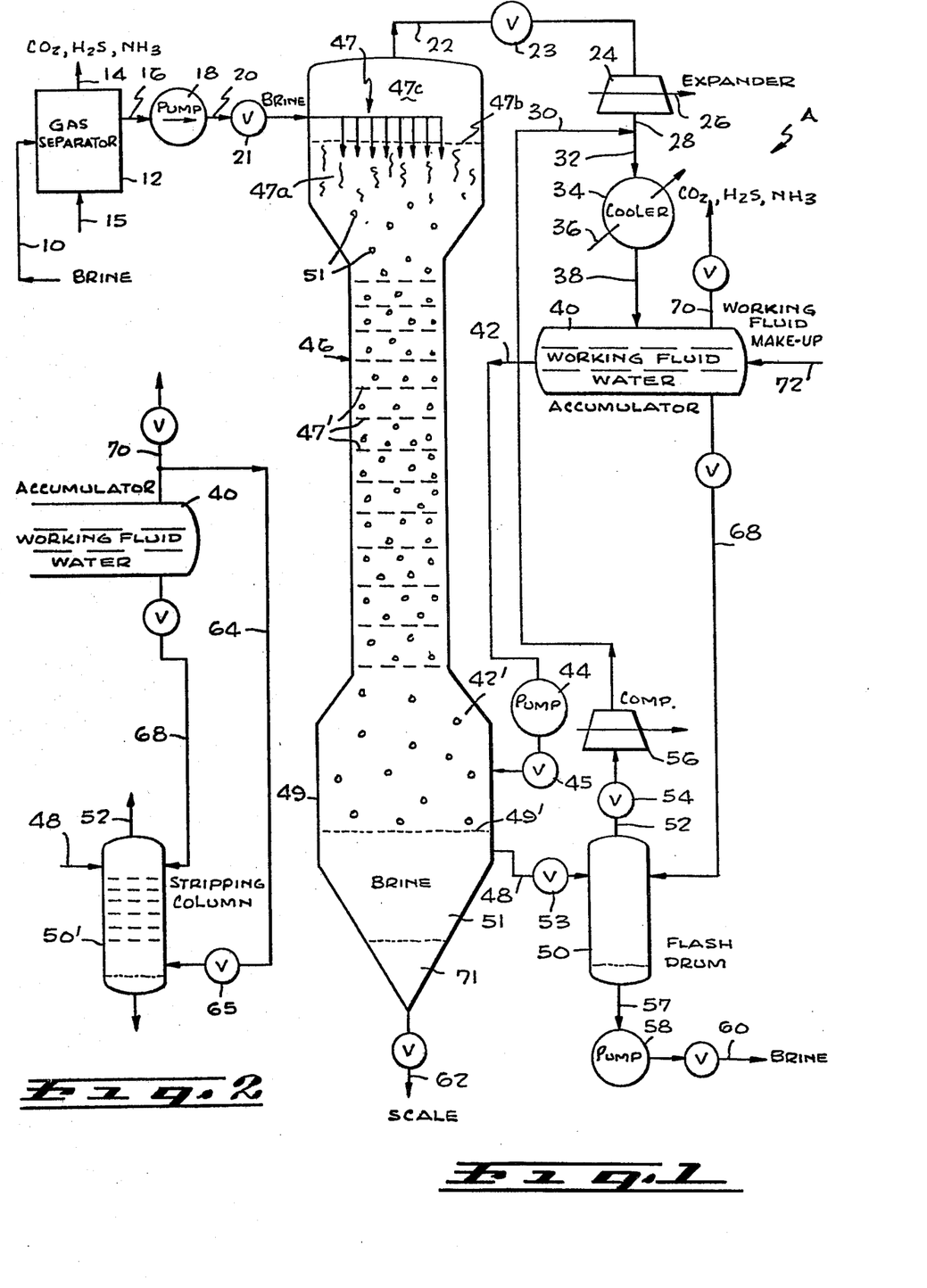
FIG. 1 is a flow chart illustrating a preferred mode of practice of the invention process and system.
FIG. 2 is a further modification of the process and system illustrated in FIG. 1, employing a stripping column for working fluid recovery instead of a flash drum.

Referring to FIG. 1 of the drawing, geothermal brine or other water containing fluid such as hot water enters through inlet means or conduit 10 into degassing unit 12 where uncondensible gases are removed through outlet means or conduit 14. For this purpose steam stripping can be used, the steam being introduced at 15 into the degasser. If desired, other means such as the use of a solid adsorption medium, e.g. a zeolite, or other means can be employed for this purpose. Usually, the uncondensible gases in hot geothermal brine include $CO_2$, $H_2S$ and $NH_3$.

The degassed hot water or brine then passes through conduit means 16 to pump 18 which discharges through the conduit means 20 via valve 21 into the top of a heat transfer column 46 in direct contact heat exchange with a working fluid. Such working fluid can be any suitable material, and characterized by a saturated vapor or saturation curve on a Mollier diagram for such fluid, having an apex at a temperature lower than the incoming hot water source temperature and at a pressure high enough to obtain good energy recovery in the expander. Also, the working fluid should have a density less than that of the water containing, e.g. brine, phase.

An example of suitable working fluids is a hydrocarbon, including aromatics, paraffins, naphthenes and olefins. Preferably, the working fluid is a paraffin or olefinic hydrocarbon containing from about 1 to about 8 carbon atoms, either straight or branched chain such as methane, ethane, propane, n-butane, isobutane, n-pentane, isopentane, neopentane, (2,2-dimethylpropane), n-hexane, cyclohexane, n-heptane, n-octane, isooctane, and the analogous olefins such as n-butene, isobutene, and the like. Most desirably, paraffinic or olefinic hydrocarbons containing from about 2 to about 5 carbon atoms are employed. Aromatic hydrocarbons such as benzene, toluene and xylene also can be used.

Mixtures of such hydrocarbons can also be utilized, such as, for example, a mixture of methane and ethane, ethane and n-propane, or n-propane and n-butane, in order to optimize the position of the apex of the working fluid's saturation curve on a Mollier diagram, and thereby obtain maximum energy recovery from the geothermal brine or hot water feed.

Working fluids other than hydrocarbons, also can be used, such as ethers, e.g. dimethyl, diethyl and methyl ethyl ether. Other substances or mixtures are also suitable as long as the position of the apex of their respective saturation curves on a Mollier diagram is appropriate, as noted above, relative to the temperature of the hot water containing feed, and such substances or mixtures are less dense than the water containing phase.

The water containing fluid or brine fed to the column can vary widely in temperature. Inlet temperature of such water or brine to the top of the column can range from about 60° to about 600° F, usually about 100° to about 600° F, with the range of about 150° to about 400° F being preferred. The heat transfer column 46 is operated so that the top of the column is below the critical pressure of the working fluid in the top of the column, such pressure preferably ranging from about 200 psia to about 700 psia. The working fluid is heated in the heat exchange column 46 by direct contact with the incoming hot brine or water. For this purpose a distributor 47 is provided at the top of the column, which can be in the form of a manifold having a plurality of spray nozzles (not shown) for spraying the hot brine or hot water at 51 downwardly into the column. However, other types of distributors can be employed such as a multiple "V" notched weir type, the distributor functioning to obtain sufficiently small drop sizes of hot liquid brine or water to provide good heat transfer rates.

The heat transfer column 46 can be of any conventional type such as disk-and-doughnut which would prevent back mixing and provide a large open area for any scale problems. Perforated plate dual flow trays as indicated schematically at 47' can be used with a high agitation, keeping any scale suspended.

The lower portion 49 of the heat transfer column functions as a liquid-liquid separator and can be a simple gravity separator or parallel plates (not shown) can be provided to improve separation and minimize entrainment of working fluid. However, any entrained working fluid can be recovered in the working fluid recovery section shown in FIG. 1 and described in greater detail below.

In the system described above, and illustrated in FIG. 1, the working fluid 42' passing upwardly in the column countercurrent to the flow of feed brine or water, is the continuous phase, and the brine or water distributed into the top of the column is the discontinuous phase, the interface 49' between the working fluid and the brine or water phases being at the bottom of the column.

As previously noted, the heat exchange column 46 is operated so that the working fluid in the top zone of the column will be below the working fluid's critical pressure. Therefore, there is a boiling zone at the top of the column, indicated at 47a, above the continuous working fluid phase 42', and an interface 47b between the liquid phases and the vapor space 47c at the top of the column.

The heated and vaporized working fluid in the boiling zone 47a at the top of the column passes into the vapor space 47c and is passed through conduit 22, via valve 23, to a work expander 24, where it expands to produce work which is transmitted through shaft 26. The expander outlet pressure can range from about 1 to about 600 psia, but is preferably in the range of about 30 to about 250 psia. As noted below, during expansion the expanded fluid most desirably is in the single phase vapor form, and not more than about 10% by weight of the expanded fluid being in the liquid phase.

Referring now to FIG. 5 illustrating a Mollier diagram showing enthalpy per lb. of working fluid plotted against entropy per lb. of working fluid, curve A illustrates the saturated vapor curve for a particular working fluid such as n-butane. It will be noted that the upper portion A' of curve A hooks around to the left and the upper end of curve A just as it hooks to the left and at the highest enthalpy on the curve is designated herein as the apex of curve A, is represented by point B. It will be noted from FIG. 5 that practically all of the saturated vapor curve A, including the hooked portion A' thereof is below the critical pressure line for the particular working fluid, designated C, the extreme left end of such critical pressure line C touching the hooked portion A' of the vapor pressure curve A, at a point near its extremity and designated D. It will accordingly be noted that operation along substantially the entire saturated vapor line A, including the hooked portion A', such as at point E below the apex B, involves operation below the critical pressure C for the fluid, and hence involves a boiling of the working fluid in the upper portion of the heat transfer column 46.

The apex, point B, on the saturated vapor curve A is defined herein as the point on the saturated vapor curve A below the critical pressure for such fluid, and corresponding to an enthalpy and a pressure which will maximize the amount of energy or work obtained from the expander per lb. of working fluid. Hence, operation of the process according to the present invention is made to take place along saturated vapor curve A at a point on such curve which is near, that is close to or approaching, the apex B on the saturated vapor curve, and corresponding to a pressure so as to maximize the amount of work obtained from the expander, while at the same time not more than about 10% of the expanded fluid becomes liquid during expansion. Such operation close to or approaching the apex B on the saturated vapor curve can take place along the saturation curve A below the apex B or beyond apex B along the hooked portion A' of the saturated vapor curve A. Thus, for example operation can take place at a point E on the saturated vapor curve A close to or approaching the apex B, and which is at a sufficiently high subcritical pressure as indicated by the pressure line F, which will provide as close to a maximum amount of work as possible during expansion, as indicated by the vertical line G extending from point E and at a temperature indicated by the temperature line F', down to a pressure indicated by point H on the lower pressure line J.

Although the amount of work thus obtained from the expander as indicated by the vertical line G showing the change in enthalpy during expansion, is less than the amount of work as indicated by line L, which would be obtained by operating, that is expanding the working fluid from a pressure at the critical pressure or above, as described in my above copending application, more pounds of working fluid are circulated when operating under subcritical conditions as indicated by line G according to the invention, than at critical or supercritical conditions as indicated by line L.

It is noted that operation can be carried out according to the invention under subcritical conditions along the hooked portion A' of the saturated vapor curve A such as at point K and which is adjacent to or approaches the apex B. On the other hand if operation is carried out along the saturated vapor curve A at a point substantially distant from the apex B, such as at a point M, a disadvantage accrues, namely the amount of work indicated by the change in enthalpy line M' thus obtained is substantially reduced. If operation is carried out along the hooked portion A' of the saturated vapor curve A, at a point substantially distant from the apex B, such as at point N, although the amount of work or energy thus obtained, as indicated by change in enthalpy line 0 is increased, a disadvantage accrues, namely, the formation of a substantial amount of liquid, that is substantially more than 10% liquid, will result during expansion, which is undesirable in that it can cause damage to the equipment.

Hence, it is preferred to operate according to the invention under subcritical pressure conditions along the saturated vapor curve A or the hooked portion A'0 thereof, at a point as close to the apex B is possible without having more than 10% condensation formed in the expander, that is, wherein not more than about 10% by weight of the vapors expanded is converted to the liquid phase. Preferably, the operation is carried out with a working fluid enthalpy at the expander inlet which is 0 to about 10%, most desirably 0 to about 5%, less than the enthalpy at the apex, on a water free basis. It will be understood that a small amount of water is usually present in the overhead working fluid. Thus, for example, the enthalpy at the apex of the saturated vapor curve for n-butane is about 363 BTU/lb. Accordingly, enthalpy at the expander inlet for this working fluid should be at a point on its saturated vapor curve corresponding to an enthalpy of not less than about 327 BTU/lb. and preferably not less than about 345 BTU/lb. Operation can take place at the apex B itself, provided that less than 10% condensation occurs on expansion. Hence the terms "near," "close to" and "approaching" the apex of the saturated vapor curve as employed herein also are intended to include operation at the apex, under the conditions noted above.

Turning now again to FIG. 1, following expansion in expander 24, expander discharge working fluid is then passed via conduit 28, wherein it is mixed with recovered working fluid from line 30, and the resulting mixture passes via line 32 into a cooler 34, using cool water or air fed through line 36 as cooling medium to condense working fluid. Condensation temperature in the cooler preferably is in the range of about 80° F to about 140° F. The condensed working fluid is then fed through conduit 38 to an accumulator 40.

Water vapor present in the working fluid in line 22 condenses in expander 24 and cooler 34, and is separated from condensed working fluid in accumulator 40, along with any uncondensibles not removed in the degasser 12.

As previously pointed out, uncondensed gas containing some working fluid is vented at 70 from the accumulator under pressure control set for an economic balance between working fluid loss in the vent gas and energy recovery in the expander. As previously noted, working fluid loss in the vent gas is decreased by degassing the inlet hot brine or water containing e.g. hot water, feed, as at 12. Accordingly, operation of accumulator 40 is carried out at a pressure greater than the saturation pressure of the working fluid, which is fixed by the temperature set in the accumulator, and which is essentially fixed by the available cooling water temperature or ambient air temperature.

This procedure reduces the concentration of working fluid vapors in the uncondensible stream vented through line 70. The following relation holds approximately:

$$Y_{wf} = (P°_{wf}/P_t)$$

where, $Y_{wf}$ is the mole fraction of the working fluid in the vapor in the accumulator 40, $P°_{wf}$ is the saturation pressure of the working fluid corresponding to the liquid working fluid temperature in the accumulator 40, and $P_t$ is the total pressure in the accumulator 40 set by the control system. The higher the setting of $P_t$, the lower the loss of working fluid in the vent gas, but also the lower the work removed from the system expander 24 through shaft 26. There will be an economic balance point for the value of $P_t$. Accordingly, the pressure in the accumulator to meet the above criteria corresponds to the expander outlet pressure less the pressure drop through the cooler 34.

The condensed working fluid in accumulator 40 is removed through line 42 and through pump 44 to pressurize the working fluid approximately to the pressure in heat transfer column 46 and the pressurized fluid is then fed via valve 45 to the bottom portion 49 of the heat transfer column 46, to be reheated. Cooled brine or water at 51 in the bottom of the heat transfer column is fed via line 48 and valve 53 therein to a flash drum 50, which is at a lower pressure than that in the accumulator. The preferred flash drum pressure is in the range of about 15 psia to about 250 psia, and the preferred flash drum temperature is in the range of about 80° F to about 140° F. Water from accumulator 40 is fed through line 68 to flash drum 50.

The working fluid flashed off in drum 50 from the cooled brine or water at 48 and the water from the accumulator, is fed through line 52 and via valve 54 to a compressor 56. The working fluid is compressed to a pressure corresponding to the above noted pressure at the work expander outlet, and preferably ranging from about 30 psia to about 250 psia. The compressed working fluid is then returned for cooling and recovery through line 30, for admixture with the working fluid expander discharge in line 28.

Uncondensible gases plus working fluid losses are vented from the system and the accumulator 40, through line 70. Make-up working fluid can be introduced into the accumulator at 72. Cooled brine or water is discharged at 57 from the flash drum 50 through pump 58 and line 60. Any scale formed in the heat exchanger column 46 is separated at 71 in the bottom of the heat transfer column and discharged through line 62.

Use of the flash drum 50 which is held at a lower pressure than the accumulator 40, to separate flashed vapors of working fluid which are then compressed in compressor 56 so that working fluid can be recovered by cooling and condensation, is a feature of the invention process and system. Reduction of pressure in the flash drum below the saturation pressure of working fluid at the bottom of column 46 will cause entrained working fluid in line 48 to vaporize in the drum 50. Also, dissolved working fluid in both the cooled brine or water at 48 and in the water at 68 from the accumulator, will partially vaporize in the flash drum. The extent of dissolved working fluid vaporization is relatively high due to the nonideal nature of the solution.

Figures 1A, 3, 4:
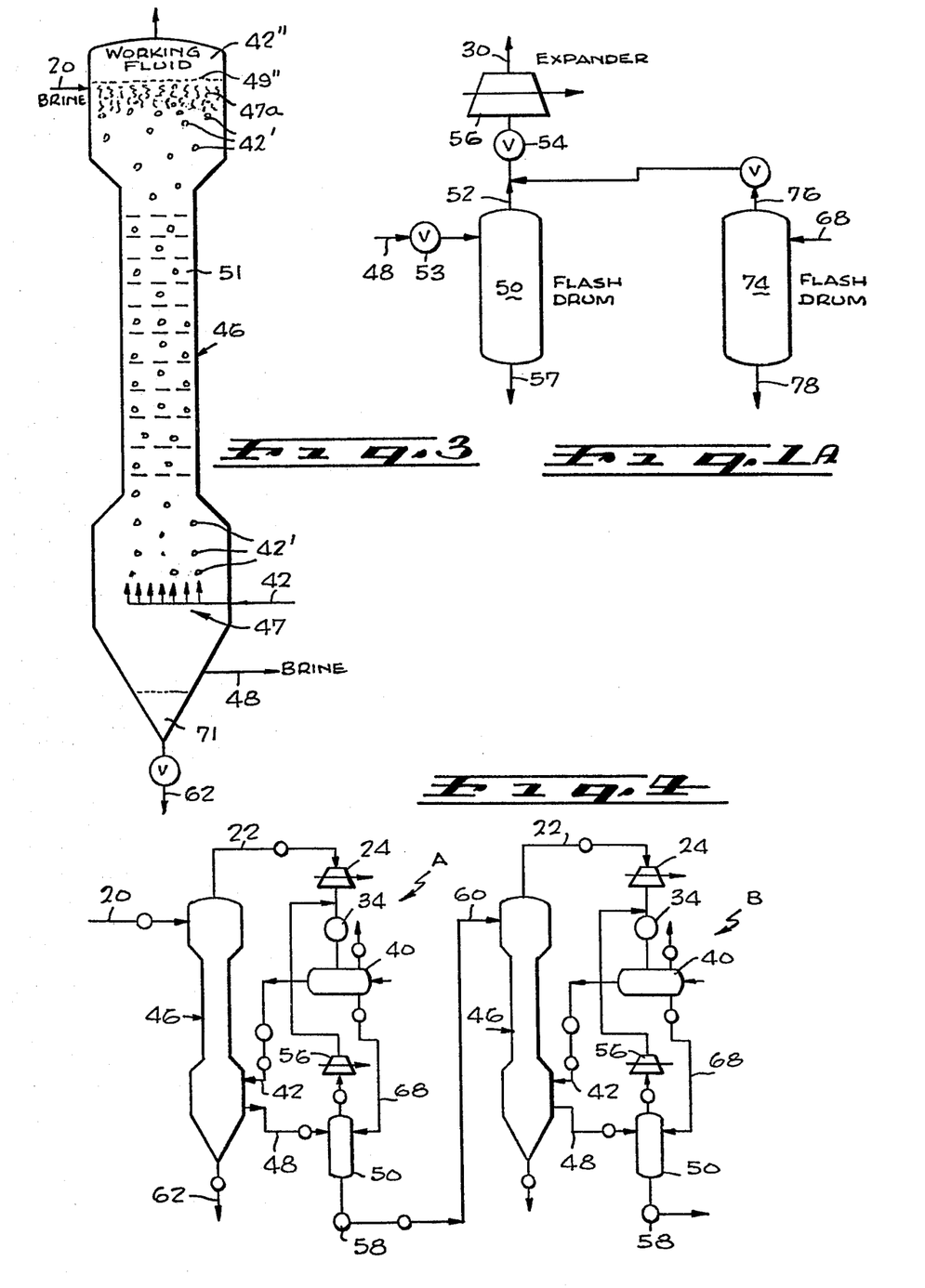
FIG. 1a is a modification of the process and system of FIG. 1, employing two flash drums.
FIG 3 illustrates a modification of the process and system of FIG. 1, wherein the brine or water feed to the heat transfer column is the continuous phase.
FIG. 4 is a modification of the basic system illustrated in FIG. 1, employing a plurality of the basic units shown in FIG. 1.
Figure 3:
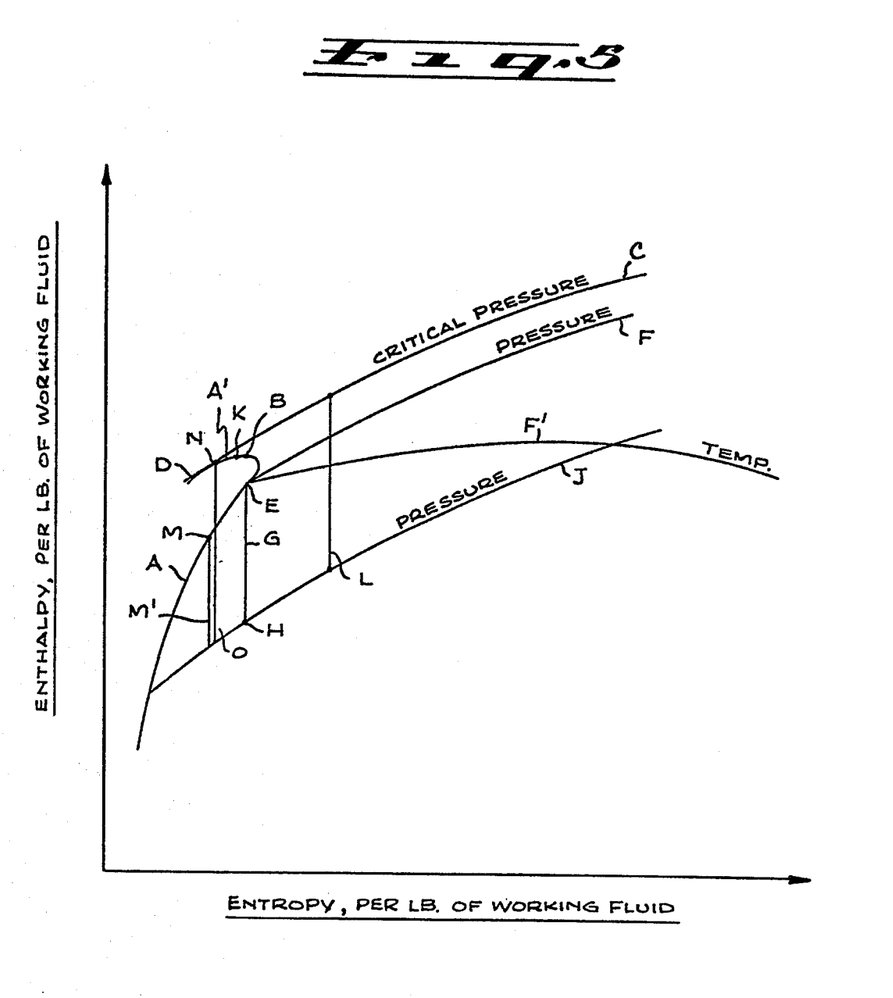

If desired, referring to FIG. 1a, condensed water in line 68 withdrawn from the accumulator, alternatively can be introduced into a separate flash drum 74, similar to 50, with the flashed working fluid exiting therefrom at 76 being mixed with the flashed working fluid at 52 withdrawn from the flash drum 50, and the mixed working fluid passed to the intake of the compressor 56. This modification permits removal of water at 78 from the separator 74, of a purity sufficient for use as drinking water.

According to another modification, additional working fluid can be removed in the process and system illustrated in FIG. 1 if flash drum 50 is replaced by a stripping column. This modification is illustrated in FIG. 2 of the drawing, employing a stripping column 50' with a portion of uncondensible gas in line 70, which contains some working fluid, recycled via line 64 and valve 65 to the stripping column 50' for stripping working fluid from the cooled brine or water in line 48 and from the accumulator water at 68. The stripping gas in line 64 consists of carbon dioxide, hydrogen sulfide and ammonia, which enter with the brine or hot water feed at 10. Where, however the column feed is hot water which has been solar heated, the stripping gas in line 64 can be a mixture of nitrogen and oxygen resulting from the solubility of the air in the water.

Since the flash drum 50 or the stripping column 50' operates at a pressure lower than that in the accumulator 40 at the outlet of the expander-cooler system, as previously noted, any entrained or dissolved working fluid in the brine or water entering the flash drum or stripping column through line 48 will substantially vaporize. When the liquid working fluid phase is thus removed from the brine or water entering at line 48, the equilibrium working fluid concentration in the brine or water becomes very small compared to what it is in the presence of the liquid working fluid phase. Therefore, losses of working fluid in the exit brine or water at 60 are very low.

However, as previously noted, losses of working fluid occur in the exit $CO_2$, $H_2S$ and $NH_3$ gas at 70 from the accumulator 40. At least part of this gas is stripped out of the brine by the working fluid in the heat transfer column 46. The stripped gas purged at 70 will carry working fluid away with it. The accumulator pressure can be raised relative to the accumulator temperature to decrease the concentration of working fluid in the accumulator gas at 70. However, this mode of operation decreases the amount of energy that can be extracted from the system. At practical energy recovery levels, the purged gas at 70 will still contain substantial quantities of working fluid, of the order of about 50 to about 80% by weight. Thus, removal of gases from the geothermal brine or hot water prior to feeding the brine to the heat transfer column, e.g. by steam stripping or adsorption on a solid material, as at 12, is preferred, for reducing such working fluid losses.

In the process and system illustrated in FIG. 1, the working fluid is the continuous phase. However, in the embodiment illustrated in FIG. 3, the distributor 47 can be positioned in the bottom of the heat transfer column and the pressurized working fluid in line 42 passed into the distributor and sprayed upwardly in the column in countercurrent direct heat exchange relation with the brine or water entering at the top of the column. In this embodiment the water containing or brine phase 51 is the continuous phase, the working fluid is the discontinuous phase, and the interface 49″ between the brine or water 51 and the working fluid phase 42″ is at the top of the column, but is now a vapor-liquid interface. Droplets of working fluid 42′ vaporize in the boiling zone 47a at the top of the column, and come off as a gas at 42″.

In order to avoid temperature pinch in the column, that is a substantial reduction of the temperature differential between the hot brine or water and the working fluid along the length of the column, thereby substantially reducing heat transfer from the hot brine or water to the working fluid, the rate of circulation of the working fluid in the column must be decreased. However, as the flow rate of the working fluid is decreased this increases the temperature of the cooled brine or water in the bottom of the column, leaving substantial heat energy remaining in the cooled brine or water exiting the bottom of the column. Thus, where the hot brine or hot water feed is, for example, 322° F, the exiting cooled brine or water at 48 can be at a relatively high temperature of about 155° F.

In order to recover the remaining energy from the water or brine leaving the system at 48 and 60 in FIG. 1, and referring to FIG. 4, such exiting brine or water is fed into the heat transfer column 46 of a second unit B essentially identical to the energy recovery unit A illustrated in FIG. 1, and including elements 46, 24, 34, 40, 50 and 46, unit B being in series with Unit A, and the operating cycle described above is repeated in Unit B. In the Unit B, however, a different working fluid, preferably a mixture of hydrocarbons, e.g. a mixture of ethane and propane, can be used to permit adjustment of the location of the apex of the saturation curve of such working fluid in relation to the temperature of the incoming brine or water feed at 60. The result is the recovery of additional energy in Unit B from each unit of weight of brine or water exiting Unit A.

The following is an example of practice of the invention process and system, it being understood that such example is merely illustrative and not limitative of the invention.

EXAMPLE

Hot water at 322° F is pumped into the top of a heat transfer column operated at an internal pressure of 500 psia. In the heat transfer column the hot water is passed into direct contact heat exchange relation with isobutane. The working fluid circulation in the column is set at a rate of 0.85 lb. isobutane per lb. of water, to be sure that there is no temperature pinch or substantially reduced $\Delta\,t$ driving force between the temperature of the hot water and the isobutane working fluid throughout the length of the column.

The isobutane working fluid thus heated by the hot water feed in the heat transfer column and at a pressure in the column below the critical pressure of isobutane but close to the apex of the saturated vapor curve for isobutane on the Mollier enthalpy-entropy diagram for this fluid, as illustrated in FIG. 5, boils in the top of the column, the temperature of the boiling vapors being 262° F. These overhead vapors having an enthalpy on a water free basis of 332 BTU/lb. (the apex on the saturated vapor curve for isobutane is at 334 BTU/lb.) are expanded through an expander to produce work. The expanded working fluid which is essentially in the vapor phase is discharged from the expander at a temperature of 150° F and a pressure of 142 psia.

The isobutane working fluid is cooled and condensed in a cooler to an outlet temperature of 100° F and a pressure of 132 psia. The isobutane working fluid condensate thus formed is introduced into an accumulator and is separated therein from uncondensible gases and condensed water. The condensed isobutane from the accumulator is then pumped at about 500 psia back into the bottom of the heat transfer column to be reheated by the hot water feed.

Cooled water from the bottom of the heat transfer column at a temperature of about 155° F, and water separated in the accumulator are fed to a flash drum operated at a pressure of 15 psia. The isobutane working fluid flashed off from the top of the flash drum is compressed to a pressure of about 142 psia and is mixed with isobutane working fluid discharged from the expander, and the resulting mixture is returned to the cooler for condensation and recovery of working fluid in the accumulator.

Water at about 155° F is removed from the flash drum and pumped to a solar heater where it is heated to 322° F and recycled as feed to the heat transfer column.

The uncondensible gases including nitrogen and oxygen, are vented from the system at the accumulator, carrying away some of the isobutane working fluid.

Make-up isobutane working fluid is introduced at a pressure of 132 psia into the accumulator to compensate for lost working fluid from the accumulator.

Calculated on a basis of the use of 0.85 lb. isobutane working fluid to 1 lb. of hot feed water, 8.5 Btu of net work is obtained from the system, considering all equipment including the expander and the pumps operating at 80% efficiency.

Removal of dissolved nitrogen and oxygen from the hot water feed prior to feeding the hot water to the heat transfer column decreases the amount of working fluid make-up and allows the expander outlet pressure to be reduced, thus allowing an increase in net work out of the system.

Energy can also be recovered according to the invention from water sources at lower temperatures than geothermal brines. Thus, for example ocean or sea brines, which are solar heated, and often at temperatures substantially lower than 100° F, e.g. down to about 60° F, can be used as feed in the invention process and system. Such brines are also understood to be encompassed within the term "hot water sources" employed herein, as contrasted to sea water brines of substantially lower temperature, for example deep sea water at about 35° F. Where ocean brine at a temperature of about 60° F is employed as feed to the invention process and system, the working fluid can be in the form of a mixture of ethane and a small amount of methane.

From the foregoing, it is seen that the invention affords a novel and efficient process and system for recovery of energy from geothermal brines and other hot water sources, employing direct contact heat exchange between the hot geothermal brine or water containing fluid, e.g. hot water, and a working fluid, preferably a hydrocarbon such as propane, n-butane or isobutane, operating under subcritical pressure conditions with respect to such working fluid, for extraction of energy from the heated working fluid in an expander, and incorporating procedure for efficient recovery of working fluid and recycling thereof for heat transfer with the geothermal brine or other water-containing feed.

While I have described particular embodiments of my invention for purposes of illustration, it will be understood that various changes and modifications within the spirit of the invention can be made, and the invention is not to be taken as limited except by the scope of the appended claims.

What is claimed is:

1. Process for recovery of energy from elevated temperature or hot water containing fluids including geothermal brines and other elevated temperature water sources, which comprises introducing said water containing fluid in a heat transfer zone in heat exchange relation therein with a working fluid in liquid form, and heating said working fluid at temperature to produce boiling thereof in the upper portion of said heat transfer zone, said heat transfer zone being maintained at a pressure below the critical pressure of said working fluid, and corresponding to operation at a point on the saturated vapor curve of the Mollier enthalpy-entropy diagram for said working fluid, close to the apex on said saturated vapor curve, expanding the boiling vapors of working fluid in an expander to produce work, cooling and condensing said expanded working fluid, separating said condensed working fluid from condensed water and uncondensible gas, and returning said condensed working fluid under pressure to said heat transfer zone for reheating therein.

2. The process as defined in claim 1, said operation being carried out at a point on said saturated vapor curve which is 0 to about 10% less than the enthalpy value at said apex, on a water free basis.

3. The process as defined in claim 2, wherein said operation is carried out at a point on said saturated vapor curve to maximize the amount of work produced by said expander and wherein not more than about 10% by weight of the vapors expanded in said expander is converted to the liquid phase.

4. The process as defined in claim 3, wherein said working fluid is a paraffinic or olefinic hydrocarbon containing from about 1 to about 8 carbon atoms, or mixtures thereof.

5. The process as defined in claim 1, wherein said operation is carried out at a point on said saturated vapor curve to maximize the amount of work produced by said expander and wherein not more than about 10% by weight of the vapors expanded in said expander is converted to the liquid phase.

6. The process as defined in claim 1, wherein said working fluid is a substance in the form of a hydrocarbon selected from the group consisting of aromatics, paraffins, naphthenes and olefins, and mixtures thereof.

7. The process as defined in claim 1, including the step of removing at least a portion of uncondensible gas in said water containing fluid prior to introduction thereof into said heat transfer zone.

8. The process as defined in claim 1, said working fluid being passed upwardly in countercurrent heat exchange relation with said hot water containing fluid being passed downwardly, in said heat transfer zone, and the flow of said working fluid being maintained at a rate sufficient to avoid temperature pinch between said working fluid and said water containing fluid along the length of said heat transfer zone.

9. The process as defined in claim 8, wherein said working fluid is introduced into the bottom of said heat transfer zone and is the continuous phase, and said water containing fluid is distributed into the top of said heat transfer zone and is the discontinuous phase, the interface between said phases being at the bottom of said heat transfer zone, and including a boiling zone for said working fluid in the top of said heat transfer zone.

10. The process as defined in claim 1, wherein said working fluid is a substance in the form of a hydrocarbon selected from the group consisting of aromatics, paraffins, naphthenes and olefins, and mixtures thereof.

11. The process as defined in claim 1, wherein said working fluid is a hydrocarbon containing 2 to 5 carbon atoms, selected from the group consisting of methane, ethane, propane, n-butane, isobutane, n-pentane, isopentane and neopentane, and the analogous olefins, and mixtures thereof.

12. The process as defined in claim 1, said water containing fluid being in direct contact heat exchange relation with said working fluid in said heat transfer zone, said water containing fluid being introduced into said heat transfer zone at a temperature ranging from about 60° to about 600° F, and said heat transfer zone being maintained at a pressure ranging from about 200 to about 700 psia.

13. The process as defined in claim 1, said working fluid being passed upwardly in countercurrent heat exchange relation with said hot water containing fluid being passed downwardly, in said heat transfer zone, and the flow of said working fluid being maintained at a rate sufficient to avoid temperature pinch between said working fluid and said water containing fluid along the length of said heat transfer zone.

14. The process as defined in claim 1, including withdrawing cooled water containing fluid from said heat transfer zone, flashing said last mentioned fluid to flash off working fluid contained in said cooled water containing fluid, compressing the resulting vaporized working fluid, and mixing said compressed working fluid with the working fluid discharged from said expander and prior to cooling and condensation thereof.

15. The process as defined in claim 1, said separating said cooled and condensed working fluid from condensed water and uncondensible gas taking place in an accumulator zone, including withdrawing a vent gas containing uncondensibles and some working fluid from said accumulator zone, withdrawing cooled water containing fluid from said heat transfer zone, flashing said last mentioned fluid to flash off working fluid contained in said cooled water containing fluid, compressing the resulting vaporized working fluid, and mixing said compressed working fluid with the working fluid discharged from said expander and prior to cooling and condensation thereof, said flashing said cooled water containing fluid being carried out in a flash zone at a pressure less than the pressure in said accumulator zone.

16. The process as defined in claim 1, said water containing fluid being in direct contact heat exchange relation with said working fluid in said heat transfer zone, said water containing fluid being introduced into said heat transfer zone at a temperature ranging from about 60° to about 600° F, and said heat transfer zone being maintained at a pressure ranging from about 200 to about 700 psia.

17. The process as defined in claim 16, the expander outlet pressure being in the range of about 1 to about 600 psia, said working fluid being cooled and condensed to a temperature in the range of about 80° to about 140° F.

18. The process as defined in claim 7, said separating said cooled and condensed working fluid from condensed water and uncondensible gas taking place in an accumulator zone, including withdrawing a vent gas containing uncondensibles and some working fluid from said accumulator zone.

19. The process as defined in claim 1, wherein said working fluid is a paraffinic or olefinic hydrocarbon containing from about 1 to about 8 carbon atoms, or mixtures thereof.

20. The process as defined in claim 19, said hydrocarbon containing 2 to 5 carbon atoms, selected from the group consisting of methane, ethane, propane, n-butane, isobutane, n-pentane, isopentane and neopentane, and the analogous olefins, and mixtures thereof.

21. The process as defined in claim 19, said heat transfer zone being a heat transfer column, said water containing fluid being in direct contact heat exchange relation with said working fluid in said heat transfer column, said hot water containing fluid being introduced into said heat transfer column at a temperature ranging from about 150° to about 400° F, and said heat transfer column being maintained at a pressure ranging from about 200 to about 700 psia.

22. The process as defined in claim 21, wherein said working fluid is distributed in the bottom of said heat transfer zone and is the discontinuous phase and said water containing fluid is introduced into the top of said heat transfer zone and is the continuous phase, the interface between said phases being in the upper portion of said heat transfer zone, and including a boiling zone for said working fluid in the top of said heat transfer zone.

23. The process as defined in claim 21, the expander outlet pressure being in the range of about 30 to about 250 psia, said working fluid being cooled and condensed to a temperature in the range of about 80° to about 140° F.

24. The process as defined in claim 23, including the step of removing at least a portion of uncondensible gas in said hot water containing fluid prior to introduction thereof into said heat transfer column.

25. The process as defined in claim 24, said separating said cooled and condensed working fluid from condensed water and uncondensible gas taking place in an accumulator zone, including withdrawing a vent containing uncondensibles and some working fluid from said accumulator zone, said removal of at least a portion of uncondensible gas in said hot water containing fluid prior to introduction into said heat transfer column and the pressure in said accumulator zone being controlled to obtain a predetermined balance between energy recovery in said expander and working fluid loss in said vent gas from said accumulator zone.

26. Process for recovery of energy from elevated temperature or hot water containing fluids including geothermal brines and other elevated temperature water sources, which comprises introducing said water containing fluid in a heat transfer zone in heat exchange relation therein with a working fluid in liquid form, and heating said working fluid at temperature to produce boiling thereof in the upper portion of said heat transfer zone, said heat transfer zone being maintained at a pressure below the critical pressure of said working fluid, and corresponding to operation at a point on the saturated vapor curve of the Mollier enthalpy-entropy diagram for said working fluid, close to the apex on said saturated vapor curve, expanding the boiling vapors of working fluid in an expander to produce work, cooling and condensing said expanded working fluid, separating said condensed working fluid from condensed water and uncondensible gas, and returning said condensed working fluid under pressure to said heat transfer zone for reheating therein, said separating said cooled and condensed working fluid from condensed water and uncondensible gas taking place in an accumulator zone, including withdrawing a vent gas containing uncondensibles and some working fluid from said accumulator zone, withdrawing cooled water containing fluid from said heat transfer zone, flashing said last mentioned fluid to flash off working fluid contained in said cooled water containing fluid, compressing the resulting vaporized working fluid, and mixing said compressed working fluid with the working fluid discharged from said expander and prior to cooling and condensation thereof, said flashing said cooled water containing fluid being carried out in a flash zone at a pressure less than the pressure in said accumulator zone.

27. The process as defined in claim 26, including withdrawing cooled water containing fluid at a moderately elevated temperature from said flash zone, introducing said last mentioned water containing fluid into a second heat transfer zone in heat exchange relation with a second working fluid in liquid form, and heating and boiling said second working fluid in said second heat transfer zone, said second heat transfer zone being maintained at a pressure below the critical pressure of said second working fluid, and corresponding to operation at a point close to the apex on the saturated vapor curve of the Mollier enthalpy-entropy for said second working fluid, said second working fluid being different from said first working fluid, expanding the boiling vapors of said heated second working fluid in a second expander to produce work, cooling and condensing said expanded second working fluid, separating the resulting condensed working fluid from condensed water and uncondensible gas, and returning said condensed second working fluid under pressure to said second heat transfer zone.

28. The process as defined in claim 27, wherein the working fluid in the first heat transfer zone is a single paraffin or olefin hydrocarbon containing from about 1 to about 8 carbon atoms, and said second different working fluid is a mixture of such hydrocarbons.

29. The process as defined in claim 28, said separating said cooled and condensed second working fluid from condensed water taking place in a second accumulator zone, including withdrawing a vent gas from said second accumulator zone, withdrawing cooled water containing fluid from said second heat transfer zone, flashing said last mentioned fluid to flash said working fluid contained in said last mentioned water containing fluid, compressing the resulting vaporized second working fluid, and mixing said compressed second working fluid with the second working fluid discharged from said second expander.

30. The process as defined in claim 26, including withdrawing condensed water from said accumulator zone and passing said condensed water into said flash zone.

31. The process as defined in claim 30, including passing a portion of said vent gas containing uncondensibles and some working fluid withdrawn from said accumulator zone, into said flash zone.

32. The process as defined in claim 31, including the step of removing at least a portion of uncondensible gas in said water containing fluid prior to introduction thereof into said heat transfer zone.

33. The process as defined in claim 32, said working fluid being a paraffinic or olefinic hydrocarbon selected from the group consisting of methane, ethane, propane, n-butane, isobutane, n-pentane, isopentane and neopentane, and the analogous olefins, and mixtures thereof.

34. The process as defined in claim 26, including withdrawing condensed water from said accumulator zone, passing said condensed water into another separate flash zone, flashing said condensed water therein to flash off working fluid in said condensed water, mixing the resulting vaporized working fluid with vaporized working fluid from the first flash zone prior to compression thereof, and withdrawing relatively pure water from said separate flash zone.

35. The process as defined in claim 26, said heat transfer zone being a heat transfer column, said water containing fluid being in direct contact heat exchange relation with said working fluid in said heat transfer column, said water containing fluid being introduced into said heat transfer column at a temperature ranging from about 100° to about 600° F, and said heat transfer column being maintained at a pressure ranging from about 200 to about 700 psia, the expander oulet pressure being in the range of about 1 to about 600 psia, said working fluid being cooled and condensed to a temperature in the range of about 80° to about 140° F, and said flash zone being maintained at a pressure ranging from about 15 to about 250 psia and at a temperature ranging from about 80° to about 140° F.

36. The process as defined in claim 35, including withdrawing condensed water from said accumulator zone and passing said condensed water into said flash zone, and passing a portion of said vent gas containing uncondensibles and some working fluid withdrawn from said accumulator zone, into said flash zone.

37. The process as defined in claim 36, including the step of removing at least a portion of uncondensible gas in said water containing fluid prior to introduction thereof into said heat transfer column.

38. The process as defined in claim 37, said removal of at least a portion of uncondensible gas in said water containing fluid prior to introduction thereof into said heat transfer column, and the pressure in said accumulator zone being controlled to obtain a predetermined balance between energy recovery in said expander and working fluid loss in said vent gas from said accumulator zone.

39. Process for recovery of energy from hot water containing fluids including geothermal brines and other hot water sources, which comprises pumping said fluid into the top zone of a heat transfer column in direct contact heat exchange relation with a working fluid in liquid form, said working fluid being a paraffinic or olefinic hydrocarbon containing from about 1 to about 8 carbon atoms, or mixtures thereof, and heating said working fluid at temperature to produce boiling thereof in the upper portion of said heat transfer zone, said working fluid in said top column of said heat transfer column being at a pressure below the critical pressure of said working fluid, and corresponding to operation at a point on the saturated vapor curve of a Mollier diagram plotting enthalpy as ordinate and entropy as abscissa, for said working fluid, said point being near the apex of said saturated vapor curve, said operation being carried out at a point on said saturated vapor curve which is 0 to about 5% less than the enthalpy value at said apex, withdrawing the boiling vapors of working fluid from said column and expanding said vapors in an expander to produce work, not more than about 10% by weight of the vapors expanded in said expander being converted to the liquid phase, cooling and condensing said expanded working fluid, separating said condensed working fluid from condensed water and uncondensible gas in an accumulator zone, returning said condensed working fluid to the lower zone of said heat transfer column for reheating therein, withdrawing a vent gas containing uncondensibles and some working fluid from said accumulator zone, withdrawing cooled water containing fluid from the bottom zone of said heat transfer column and passing said fluid to a flash zone, withdrawing condensed water from said accumulator zone and passing said condensed water into said flash zone, flashing the fluids in said flash zone to flash off working fluid, compressing the resulting vaporized working fluid, and mixing said compressed working fluid with the working fluid discharged from said expander and prior to cooling and condensation thereof, said flashing said cooled water containing fluid and said condensed water from said accumulator zone, in said flash zone, being carried out at a pressure therein less than the pressure in said accumulator zone.

40. The process as defined in claim 39, including discharging cooled water containing fluid from said flash zone, and removing any scale from the bottom zone of said heat transfer column.

41. The process as defined in claim 39, said hot water containing fluid being introduced into said heat transfer column at a temperature ranging from about 150° to about 400° F, and said heat transfer column being maintained at a pressure ranging from about 200 to about 700 psia, the expander outlet pressure being in a range of from about 30 to about 250 psia, said working fluid being cooled and condensed in a cooler to a temperature in the range of about 80° to about 140° F, and said flash zone being maintained at a pressure ranging from about 15 to about 250 psia and at a temperature ranging from about 80° to 140° F.

42. The process as defined in claim 41, said removal of at least a portion of uncondensible gas in said hot water containing fluid prior to introduction thereof into said heat transfer column and the pressure in said accumulator zone being controlled to obtain a predetermined balance between energy recovery in said expander and working fluid loss in said vent gas from said accumulator zone, including discharging cooled water containing fluid from said flash zone, and removing any scale from the bottom zone of said heat transfer column.

43. System for recovering energy from hot water containing fluids including geothermal brines and other hot water sources, which comprises in combination a heat transfer column, pump means for pressurizing and introducing said hot water containing fluid into said column, means for introducing a working fluid into said column, means for maintaining said heat transfer column below the critical pressure of said working fluid, and corresponding to operation at a point on the saturated vapor curve of the Mollier enthalpy-entropy diagram for said working fluid, close to the apex on said saturated vapor curve, means providing a boiling zone for said working fluid at the top of the column, an expander, means for withdrawing hot working fluid from said column and introducing said fluid as feed to said expander, cooling means for cooling and condensing said expanded working fluid, accumulator means for separating and condensing working fluid from condensed water and uncondensible gas, conduit means interconnecting said expander, said cooling means and said accumulator means, and means for returning said condensed working fluid to said heat transfer column.

44. The system as defined in claim 43, including means for removing at least a portion of uncondensible gas in said hot water containing fluid prior to introduction thereof into said heat transfer column.

45. System for recovering energy from hot water containing fluids including geothermal brines and other hot water sources, which comprises in combination a heat transfer column, pump means for pressurizing and introducing said hot water containing fluid into said column, means for introducing a working fluid into said column, means for maintaining said heat transfer column below the critical pressure of said working fluid, means providing a boiling zone for said working fluid at the top of the column, an expander, means for withdrawing hot working fluid from said column and introducing said fluid as feed to said expander, cooling means for cooling and condensing said expanded working fluid, accumulator means for separating and condensing working fluid from condensed water and uncondensible gas, conduit means interconnecting said expander, said cooling means and said accumulator means, and means for returning said condensed working fluid to said heat transfer column, conduit means for withdrawing cooled water containing fluid from the bottom portion of said heat transfer column, flash means, said conduit means communicating with said flash means for introducing said cooled water containing fluid therein, means for compressing the resulting vaporized working fluid withdrawn from said flash means, conduit means interconnecting said flash means and said compressing means, and conduit means from the discharge of said compressing means for mixing the compressed working fluid with the working fluid discharged from said expander and prior to introduction thereof into said cooling means.

46. The system as defined in claim 45, including means for withdrawing a vent gas containing uncondensibles and some working fluid from said accumulator means, and conduit means for withdrawing condensed water from said accumulator means and passing said condensed water into said flash means.

47. The system as defined in claim 46, including conduit means for passing a portion of said vent gas containing uncondensibles and some working fluid from said accumulator means to said flash means.

48. The system as defined in claim 47, including means for removing at least a portion of uncondensible gas in said hot water containing fluid prior to introduction thereof into said heat transfer column.

49. Process for recovery of energy from elevated temperature or hot water containing fluids including geothermal brines and other elevated temperature water sources, which comprises introducing said water containing fluid in a heat transfer zone in heat exhange relation therein with a working fluid in liquid form, and heating said working fluid at temperature to produce boiling thereof in the upper portion of said heat transfer zone, said heat transfer zone being maintained at a pressure below the critical pressure of said working fluid, and corresponding to operation at a point on the saturated vapor curve of the Mollier enthalpy-entropy diagram for said working fluid, close to the apex on said saturated vapor curve, expanding the boiling vapors of working fluid in an expander to produce work, cooling and condensing said expanded working fluid, separating said condensed working fluid from condensed water and uncondensible gas, and returning said condensed working fluid under pressure to said heat transfer zone for reheating therein, withdrawing cooled water containing fluid from said heat transfer zone, flashing said last mentioned fluid to flash off working fluid contained in said cooled water containing fluid, compressing the resulting vaporized working fluid, and mixing said compressed working fluid with the working fluid discharged from said expander and prior to cooling and condensation thereof.

* * * * *